Feb. 17, 1925.

A. L. THORNTON

COOKING AND SERVING RECEPTACLE

Filed March 3, 1924

1,526,397

WITNESSES

INVENTOR
A. L. Thornton,
BY

ATTORNEYS

Patented Feb. 17, 1925.

1,526,397

UNITED STATES PATENT OFFICE.

ALBIN LEE THORNTON, OF EL PASO, TEXAS.

COOKING AND SERVING RECEPTACLE.

Application filed March 3, 1924. Serial No. 696,585.

*To all whom it may concern:*

Be it known that I, ALBIN LEE THORNTON, a citizen of the United States, and a resident of El Paso, in the county of El Paso and State of Texas, have invented certain new and useful Improvements in Cooking and Serving Receptacles, of which the following is a specification.

This invention relates to an improvement in cooking and serving receptacles, and is specially designed for use in cooking and serving pie although of course adapted for use with other foods and confections.

The object of the invention is to provide a cooking and serving receptacle of this character having individual serving dishes or receptacles, each of which is adapted to contain a separate and individul portion of pie, pudding or other foods or confections, the individual dishes or receptacles being organized in a single main container to facilitate handling and cooking but being freely and separably removable from said main container so that the serving of one or more of the individual portions does not impair the quality of the remaining portions.

A further object is to provide a cooking and serving receptacle having the foregoing enumerated advantages and capacities and which is also of simple and durable and practical construction, which is highly sanitary, which is reliable and convenient in use and which is easy and comparatively inexpensive to manufacture.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1:
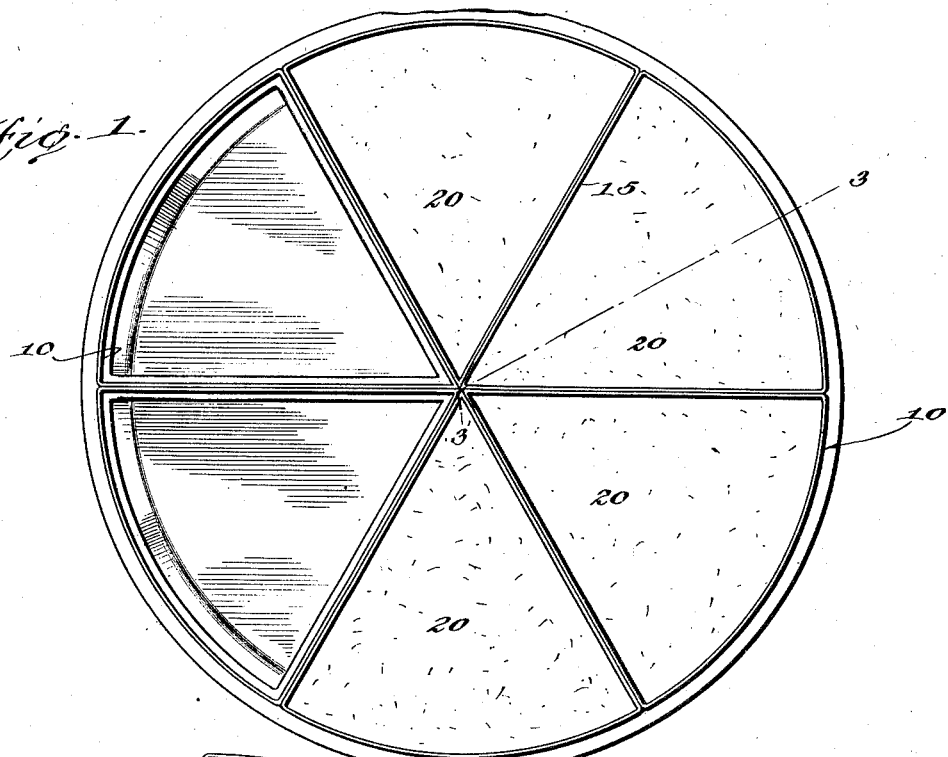
Figure 1 is a top plan view, showing the preferred embodiment of the invention.
Figure 2:
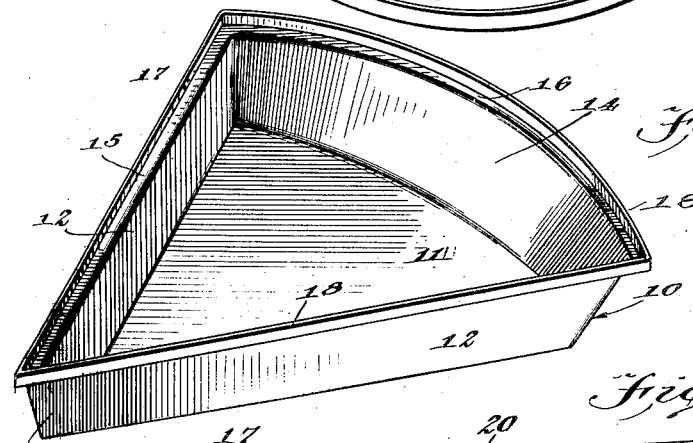
Figure 2 is a detail perspective view, showing one of the individual serving dishes or receptacles.
Figure 3:
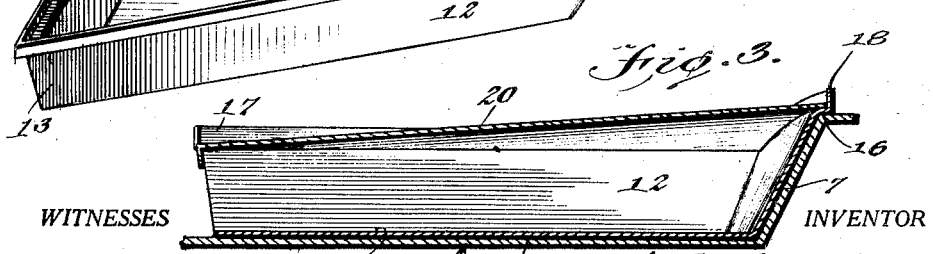
Figure 3 is a fragmentary view in vertical section on line 3—3 of Figure 1.

Referring to the drawings wherein for the sake of illustration is shown one embodiment of the invention, the numeral 5 designates generally a main container which has a circular bottom 6, an upwardly and outwardly inclined side 7 and a peripheral flange 8 around the upper edge of its side 7. This main container corresponds closely to the ordinary pie plate, but it is to be understood that it may be constructed of various materials as well as of metal.

Individual cooking and serving receptacles, designated generally at 10 are provided and are fitted in the main container 5. The individual cooking and serving receptacles 10 are sector-shaped and are provided in such a number and of such size as to completely fit the main container, as shown in Figure 1. Each receptacle 10 includes a bottom plate 11 having integral side walls 12 which are vertically disposed and suitably secured together, as at 13, at the pointed end of the receptacle. A curved back wall 14 is suitably connected to the side walls 12 and bottom wall 11. The walls 12 and 14 have outwardly extending marginal flanges, designated at 15 and 16, respectively, and upwardly extending flanges designated at 17 and 18, respectively, the flanges 15, 16, 17 and 18 defining seats adapted to receive a top or cover 20 which may be suitably sealed or secured to the seats if desired. The exposed face of the top or cover may contain advertising matter or other suitable indicia.

With this arrangement all of the individual cooking and serving receptacles 10 are easily and readily handled for they are snugly fitted in the main container 5. The filling in each receptacle 10 and by this is also meant the top crust is entirely contained within the receptacle below the flanges 15 and 16 so that the top 20 protects the entire contents of each individual receptacle 10 and thus if several of the individual portions are used the remaining portions have their quality unimpaired and are protected from dust, flies or the like.

It is to be understood that the receptacles 10 may be constructed of metal, china, or other suitable material.

I claim:

In a device of the character described, a main container of circular form and having a bottom wall and a side wall provided with a peripheral flange, a plurality of individual cooking and serving receptacles of sector-shaped form, said receptacles being snugly fitted in the main container and being readily removable therefrom, each of said receptacles comprising a bottom wall, side walls and a back wall, the side walls and the back wall having flanges at their upper edges, said flanges constituting seats, and a top fitted on the seats of each receptacle, the flange of the back wall overlying and engaging the peripheral flange of the main container and the flanges of the side walls of adjacent containers fitting against each other in close contact whereby material, especially boiled over juices, is prevented from getting down between the individual cooking and serving vegetables and the main containers.

ALBIN LEE THORNTON.